Jan. 11, 1949.  J. D. LINDSAY  2,458,864
METHOD OF MAKING INTEGRAL MOLDED STRUCTURES
Filed Jan. 1, 1945  3 Sheets-Sheet 1

INVENTOR.
JOHN D. LINDSAY
BY
John R. Faulkner
ATTORNEY.

Jan. 11, 1949.    J. D. LINDSAY    2,458,864
METHOD OF MAKING INTEGRAL MOLDED STRUCTURES
Filed Jan. 1, 1945    3 Sheets-Sheet 2

INVENTOR.
JOHN D. LINDSAY
BY
John R. Faulkner
ATTORNEY.

Jan. 11, 1949.   J. D. LINDSAY   2,458,864
METHOD OF MAKING INTEGRAL MOLDED STRUCTURES
Filed Jan. 1, 1945   3 Sheets-Sheet 3

INVENTOR.
JOHN D. LINDSAY
BY John R. Faulkner
ATTORNEY.

Patented Jan. 11, 1949

2,458,864

UNITED STATES PATENT OFFICE 2,458,864

METHOD OF MAKING INTEGRAL MOLDED STRUCTURES

John D. Lindsay, Grosse Pointe Woods, Mich.

Application January 1, 1945, Serial No. 570,991

13 Claims. (Cl. 154—110)

My invention relates generally to methods of making laminated structures, and more particularly to methods for making integral molded structures from a plurality of layers of fibrous sheet material adhesively bonded together.

One of the objects of the invention is to provide a novel method for forming laminated structures having the laminations thereof integrally bonded together with a suitable adhesive.

Another object of the invention is to provide a novel method for molding a plurality of layers of fibrous sheet material, such as wood veneer, said layers having a suitable adhesive such as a thermoplastic or a thermosetting resin therebetween, into either a flat laminated structure or into a contoured structure, the resulting structure being integrally bonded together.

A further object of the invention is to provide a novel method for applying heat and pressure to a plurality of sheets of fibrous material having a suitable adhesive therebetween, wherein the heat is applied in close proximity to the superposed sheets and the pressure is so distributed over the surface of the structure being molded that the latter is molded to conform to the surface of a contoured mold and the superposed layers are securely bonded together over their entire contacting surfaces.

A further object is to provide a novel method for making plywood sheets and for making contoured plywood structures such as boat hulls, aircraft wings and fuselages, vehicle bodies, and numerous other laminated veneer structures.

The foregoing, as well as other objects, will be made more apparent as this description proceeds, especially when considered in connection with the accompanying drawings, wherein.

Figure 1:
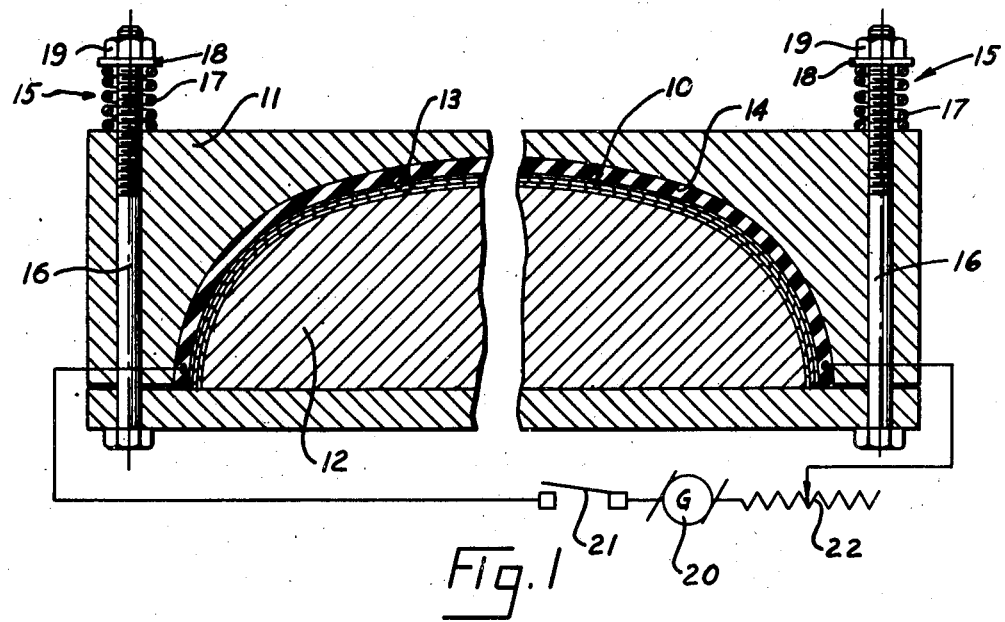
Figure 1 is a semi-diagrammatic cross sectional view, partially broken away, of a mold illustrating one method of forming integrally molded laminated structures in accordance with the present invention.

To form laminated structures in accordance with the method disclosed in the present invention, relatively thin sheets of fibrous material, such as wood veneer, are pre-cut to the desired size, and are placed in juxtaposition upon a mold which corresponds in contour to the desired contour of the finished product. A suitable adhesive is interposed between adjacent sheets, and although a number of different adhesives or glues may be used to advantage, a thermoplastic such as polyvinyl butyral or a thermo-setting resin of the phenol formaldehyde type is preferred, and with the method employed herein will bond the sheets of wood veneer together to form a tough strong structure. The adhesive may be applied to either or both of the adjacent surfaces of adjacent sheets, and may be applied in any suitable manner such as by spraying, spreading, brushing, dipping, or in a thin sheet or film.

Heat and pressure are applied to the sheets through the medium of a layer of an electrically conducting elastomer positioned adjacent the sheets. The elastomer used may be the product known commercially as electrically conducting rubber, which is a material having many of the characteristics and properties of rubber but which has been rendered conducting by the addition of an ingredient or ingredients such as acetylene carbon black or the like. An elastomer of this type will conduct electricity and consequently, because of its resistance, will become heated when current is passed through it by reason of the application of an electric potential thereto. Such an elastomer will also have the properties of flexibility and elasticity, and will deform and flow under pressure.

Any suitable and convenient means may be employed to apply pressure to the sheets through the medium of the elastomer. For example, the layer of elastomer may be mounted upon a mold which in turn may be forced toward a complementary mold by clamps, springs, hydraulic pressure, or any other means adapted to the purpose. Since the elastomer will deform or flow under pressure, substantially uniform pressure will be applied to all parts of the sheets irrespective of irregularities in the thickness of the sheets or in the contour of the molds.

In lieu of using a pair of complementary molds with a relatively thin layer of conducting rubber adjacent one of the molds, my method can be carried out to advantage by using a single mold, either male or female, together with a suitably mounted relatively thick layer of conducting rubber. The wood veneer sheets are placed between the mold and the rubber, and upon the application of pressure the thick rubber layer flows sufficiently to mold the sheets to the contour of the mold. Or, if desired, the thick rubber layer may have a contour complementary to that of the mold to facilitate the molding operation.

During the molding operation, an electric current is passed through the electrically conducting elastomer, producing heat therein which in turn heats the sheets and the interposed adhesive. If the adhesive used is a thermoplastic, the heat will soften it; whereas if a thermosetting resin is used, the latter will be polymerized or cured by the heat.

The combination of heat and pressure causes the sheets to be molded to the contour of the mold and to be bonded to each other and to adhere throughout their areas. The amount of heat, the pressure, and the length of time each is applied are factors which can be varied depending upon the number of sheets, their thickness, the type of adhesive used, and the shape of the finished laminated structure. The current flow can be decreased or stopped prior to the removal of the laminated structure from the mold to sufficiently decrease the heat applied to permit the adhesive to properly set.

The advantages of the method briefly described above are many. A minimum of equipment is required and much of the equipment can be used for molding a number of laminated structures of different sizes and shapes. The heat is efficiently applied in close proximity to the sheets being molded, and the pressure required can be applied in a number of different ways. Furthermore the pressure is distributed over the surface of the sheets in such a manner that a uniform strong bond is made between the sheets regardless of irregularities therein.

The word "laminated" as used in this application is intended to cover all structures having two or more relatively thin sheets bonded together.

The general method embraced in this invention may be carried out in several different manners, a detailed description of some of which follow.

Although my method can be used to produce a variety of structures of different dimensions and shapes, and for different uses, I have illustrated a method of producing the hull of a small boat, which is but one of the many types of structures which may be readily manufactured. In forming the hull section 10, Figure 1, a suitable female mold 11 and a male mold 12 are used. The molds may be made of any suitable material, such as hardwood, and are shaped to correspond to the desired shape of the hull section. A plurality of sheets of wood veneer 13 are then placed between the molds 11 and 12, and as hereinbefore described, are coated with a suitable adhesive, such as a thermoplastic or a thermosetting resin. If a thermoplastic is used it may be applied in solid form such as a thin sheet between adjacent layers of the wood veneer. If a thermosetting resin is used it is applied in fluid form.

Positioned adjacent the mold 11 is a layer 14 of electrically conducting rubber or other elastomer. In the present instance the mold 11 is adapted to be forced toward the mold 12 by a plurality of clamps 15. The clamps 15 comprise bolts 16 extending through suitable aligned holes in the molds, springs 17, washers 18 and nuts 19. After the sheets 13 have been placed between the molds and the conducting rubber layer positioned adjacent the sheets, the nuts 19 are tightened, exerting pressure through the springs 17 and forcing the assembly into the position shown in Figure 1.

Coincident with the application of pressure, an electric current is passed through the conducting rubber layer 14. Figure 1 diagrammatically shows an electric circuit comprising a generator 20 connected to opposite extremities of the rubber layer 14, a switch 21 and a rheostat 22. The current passing through the rubber produces heat therein which is readily transferred to the adjacent wood veneer sheets 13, softening the latter and rendering them more pliable, thus facilitating the molding thereof. The thermoplastic or thermosetting resin between the sheets is also heated and partially penetrates into the fibers of the wood veneer.

Under pressure the layer of conducting rubber 14 flows and can be deformed. This characteristic of rubber makes it an extremely advantageous material to use in the present method, since a substantially uniform pressure is exerted over the entire surface of the material being molded regardless of irregularities in the thickness of the latter or in the molds themselves, thus insuring a uniform bond throughout the material.

If desired, the current flow through the rubber may be reduced by means of the rheostat 22, or entirely stopped by opening the switch 21, some time prior to the release of the pressure and the removal of the molded wood veneer sheets from the mold, to allow veneer sheets to cool sufficiently so that upon removal of the pressure they will retain their molded shape and will be integrally bonded together. The exact control of the electric current and the length of time the pressure should be kept applied after opening the switch are dependent upon a number of factors including the number and thickness of the veneer sheets, the properties of the adhesive used, and the rate of heat dissipation through the mold and the layer of rubber. The rate of cooling can be accelerated by subjecting the entire molding device to a lower temperature, by directing air upon it, by circulating a coolant through the molds 11 and 12, or by any other suitable means.

After the veneer sheets 13 have become permanently molded and bonded together, the pressure may be released, the molds separated from each other and the molded structure removed. A sheet of non-adhesive material, such as wax paper, may be placed upon opposite sides of the laminated structure to prevent the veneer from adhering to the mold or to the layer of rubber.

Figure 2:
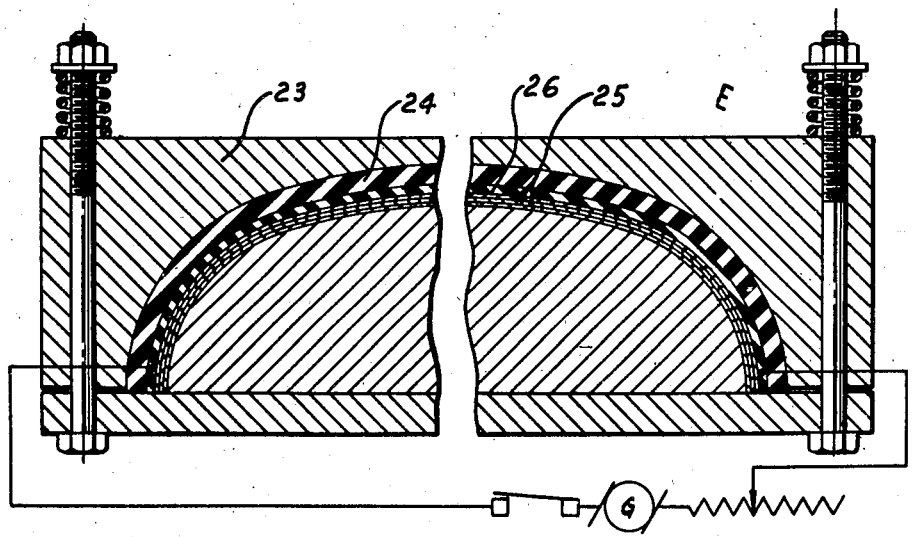
Figure 2 is a view similar to Figure 1 but showing a modification of my method.

A modification of the method described above is shown in Figure 2, in which the female mold 23 carries a relatively thick layer 24 of rubber or other elastomer. Between the layer 24 and the veneer sheets 25 is a relatively thin layer 26 of electrically conducting rubber. This modification primarily differs from the first described method in that the conducting rubber layer has only one principal function, namely to furnish heat in close proximity to the wood veneer sheets; whereas the rubber layer in Figure 1 has two functions, namely to furnish heat and to distribute the pressure over the surface of the sheets. In Figure 2 the layer 24 can be of ordinary non-conducting rubber since its only function is to mold the veneer sheets by deforming or flowing under pressure. Thus a saving in the quantity of conducting rubber is effected, and the heat produced thereby is concentrated immediately adjacent the veneer sheets where it will act most effectively upon the latter and upon the adhesive.

Figure 3:
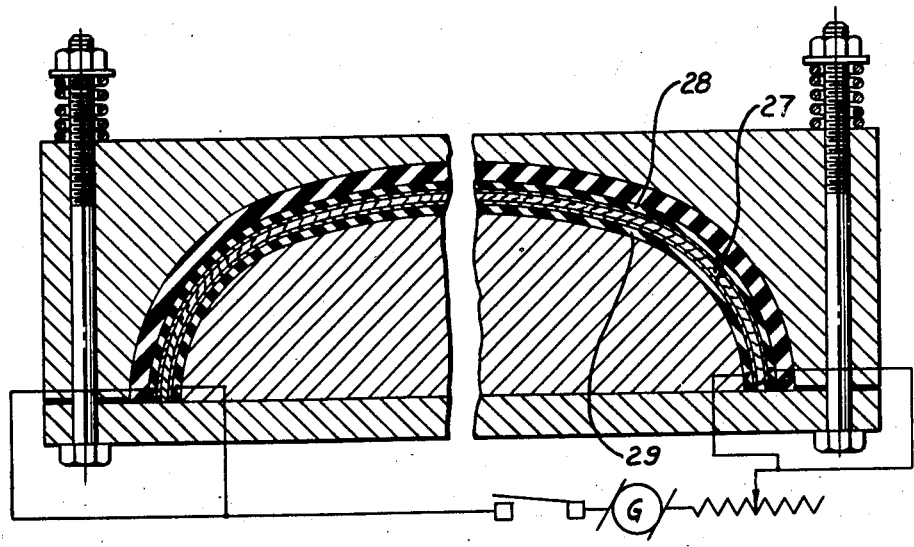
Figure 3 is a cross sectional view similar to Figure 2 but illustrating another modification of my method.

The modified method shown in Figure 3 differs from that of Figure 2 by applying heat to opposite sides of the wood veneer sheets 27 through the medium of two relatively thin layers of conducting rubber 28 and 29 positioned adjacent the veneer sheets 27 on opposite sides thereof. This adaptation of my method is particularly advantageous when used to form a relatively thick molded structure, such as one having a relatively thick section of lightweight porous material reinforced on opposite sides with layers of relatively thin tough veneer.

Figure 4:
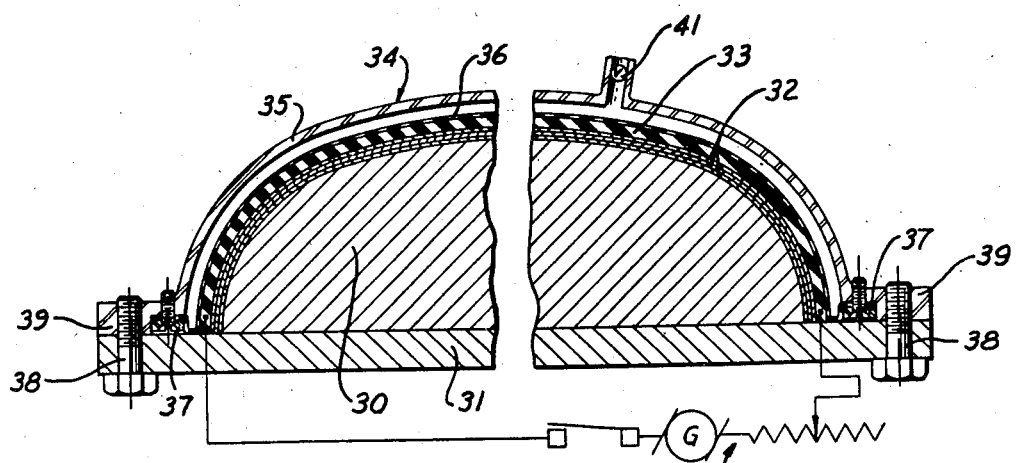
Figure 4 is a cross sectional view of another modification.

Figure 4 illustrates another manner in which my method may be applied. As shown, 30 is a male mold of suitable material mounted upon a base 31. The veneer sheets 32 are positioned adjacent the upper surface of the mold and a layer of electrically conducting rubber is placed over the latter. A pressure chamber 34 is positioned over the rubber layer 33 and comprises the hood 35 and the flexible diaphragm 36, the latter having its outer edges clamped to the hood by means of the retaining strips 37. The hood 35 is detachably fastened to the base 31 by bolts 38 which engage tapped holes in the flanges 39 of the hood.

An electric current is passed through the rubber layer 33 by means of the electric circuit 40, resulting in the application of heat to the wood veneer sheets and the interposed adhesive. Either simultaneously with the application of heat, or after the lapse of a predetermined interval of time, fluid under pressure is admitted to the chamber 34 through the valve 41, forcing the diaphram 36 against the rubber layer 33 and molding the wood veneer sheets to the contour of the mold. Although any suitable fluid under pressure can be used, air is preferred. When the molding is completed, the heat and pressure are released, the chamber 34 disconnected from the base, and the molded structure removed from the mold.

Figure 5:
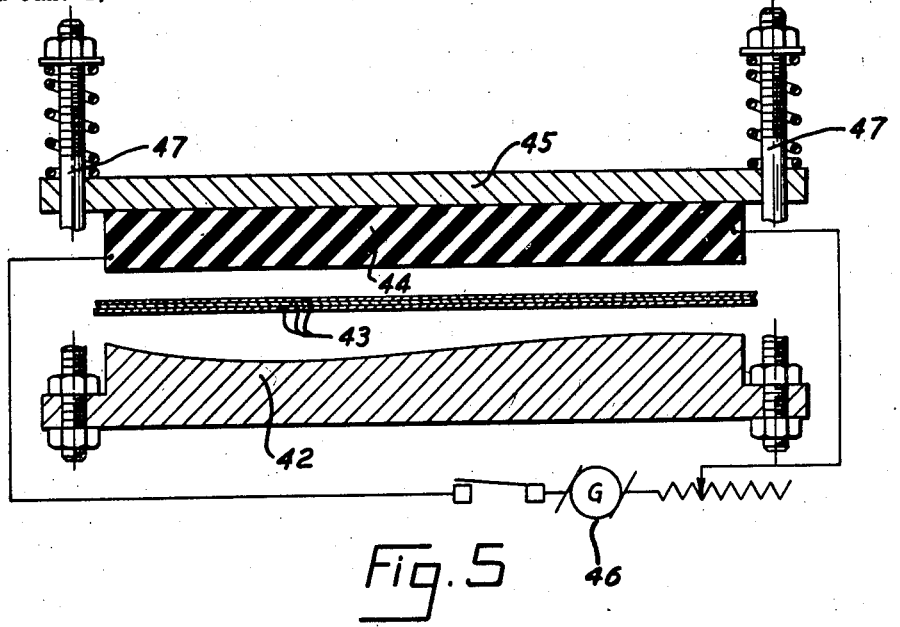
Figure 5 is a semi-diagrammatical cross sectional view of a mold and associated elements which may be employed in carrying out the method of the present invention.
Figure 6:
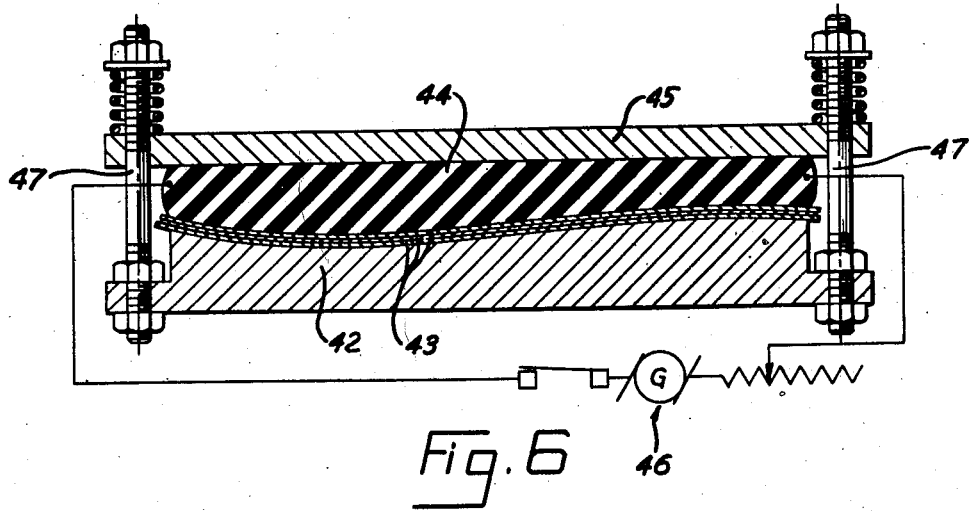
Figure 6 is a view similar to Figure 5 but showing the molded structure under pressure.

Structures having a limited contour may be advantageously molded by placing the wood veneer sheets between a contoured mold and a relatively thick flat layer of electrically conducting elastomer, passing an electric current through the elastomer, and applying pressure to force the elastomer and the mold toward each other. As shown in Figure 5, 42 is a contoured mold, 43 are sheets of wood veneer coated with the desired thermoplastic or thermosetting resin, and 44 is a thick, flat layer of electrically conducting rubber or other elastomer carried by a platen 45. An electric circuit 46 is adapted to furnish current to the rubber and spring loaded bolts 47 interconnect the mold 42 and the platen 45. Figure 5 shows the mold and platen separated, prior to the application of pressure. In Figure 6, pressure has been applied by tightening the bolts 47, and the combination of heat and pressure has molded the veneer sheets to the desired shape. Under pressure the thick layer of rubber flows and becomes deformed, and distributes the applied pressure over the entire surface of the sheets to form the latter to the contour of the mold. A substantial saving is possible since a single flat layer of conducting rubber can be used with molds of varying contours to mold a number of differently shaped structures, thus eliminating the necessity for a different upper mold for each structure.

If desired, the upper mold may be formed of a layer of conducting rubber having one surface shaped to correspond to that of the lower mold. With this arrangement the rubber would only need deformation to compensate for irregularities in the mold or the sheets. As an alternate construction the upper rubber mold could be precut or preformed to partially conform to the lower mold. This would eliminate part of the required deformation and would be particularly advantageous in molding structures requiring considerable bending and forming of the wood veneer sheets. Instead of the thick layer of rubber shown in Figures 5 and 6, a relatively thin layer of conducting rubber, backed by a thick layer of ordinary rubber, can be used.

The method described herein and comprising the present invention is not limited to the manufacture of boat hulls, but can be used to make many other molded structures having various contours, and also to make flat laminated or plywood sheets. Furthermore it is not limited to the use of wood veneer layers, since suitable fibrous material, fabric, or other material can be used. It is also within the contemplation of the invention to mold a single sheet or layer of material by heat and pressure applied according to the teachings of this application. Similarly, various thermoplastics, thermosetting resins, or other adhesives can be used. These and other changes can be made without departing from the spirit and scope of the invention, as defined in the appended claims.

I claim:

1. The method of forming a laminated structure which includes the steps of placing a plurality of sheets of relatively thin material upon a mold, applying an adhesive between adjacent sheets, positioning a layer of soft pliable electrically conducting elastomer adjacent the superposed sheets, applying electrical energy to the elastomer to produce heat therein and to heat the sheets and the interposed adhesive, applying pressure to a rigid inflexible member and thus to the sheets through the soft pliable elastomer, maintaining said heat and pressure until the sheets have become bonded together, and thereafter separating the molded structure from the mold.

2. The method of forming a laminated structure which includes the steps of placing a plurality of sheets of relatively thin material upon a contoured mold, applying an adhesive between adjacent sheets, positioning a layer of soft pliable electrically conducting elastomer adjacent the superposed sheets, passing an electric current through the elastomer to produce heat therein and to thereby heat the adjacent sheets and the interposed adhesive, applying pressure to mold the sheets to the contour of the mold, maintaining said heat and pressure until the sheets have become bonded together, and thereafter separating the molded structure from the mold.

3. The method of forming a laminated structure which includes the steps of placing a plurality of sheets of relatively thin material adjacent a mold, applying an adhesive between adjacent sheets, positioning a layer of electrically conducting elastomer adjacent the superposed sheets on opposite sides thereof, applying electrical energy to the layers of elastomer to produce heat on opposite sides of the superposed sheets and in close proximity thereto to thereby heat said sheets and the interposed adhesive, applying pressure to the sheets, and maintaining said heat and pressure until the sheets have become bonded together.

4. The method of forming a laminated structure which includes the steps of placing a plurality of sheets of relatively thin material upon a mold, applying an adhesive between adjacent sheets, positioning a relatively thin layer of electrically conducting elastomer adjacent the superposed sheets, positioning a relatively thick layer of non-conducting elastomer adjacent the layer of conducting elastomer and on the opposite side thereof from the superposed sheets, applying electrical energy to the electrically conducting elastomer to produce heat in close proximity to the sheets whereby said sheets and the interposed adhesive are heated, and applying pressure to mold the sheets to the contour of the mold, said pressure being transmitted through the relatively thick layer of non-conducting elastomer whereby the latter is deformed sufficient to bond the sheets together throughout their entire contacting areas regardless of irregularities in the mold or in the thickness of the sheets.

5. The method of forming a laminated structure which includes the steps of placing a plurality of sheets of relatively thin material upon a mold, applying an adhesive between adjacent sheets, positioning a layer of electrically conducting elastomer in close proximity to the superposed sheets, positioning a pressure chamber on the opposite side of said sheets from the mold, said pressure chamber including a flexible wall on the side thereof toward the superposed sheets, applying electrical energy to the elastomer to heat the sheets and the interposed adhesive, and applying fluid pressure within the pressure chamber, said pressure being transmitted through the flexible wall of the chamber to mold the sheets to the contour of the mold and to bond them together.

6. The method of forming a laminated structure which includes the steps of placing a plurality of sheets of relatively thin material upon a mold, applying an adhesive between adjacent sheets, positioning a pressure chamber on the opposite side of said sheets from the mold, said pressure chamber including a wall of electrically conducting elastomer adjacent the superposed sheets, passing an electric current through the elastomer to produce heat therein to heat the sheets and the interposed adhesive, and applying fluid pressure within the pressure chamber, said pressure being transmitted through the elastomer to mold the sheets to the contour of the mold and to bond them together.

7. The method of forming a molded laminated structure from thin sheet material which includes the steps of placing a plurality of said sheets and one or more interposed layers of adhesive adjacent a contoured mold, positioning a relatively thick flat layer of electrically conducting elastomer adjacent the superposed sheets on the opposite side thereof from said mold, and molding said sheets to conform to the contour of the mold and to become bonded together by applying pressure to the sheets through the thick flat layer of elastomer and applying electrical energy to the elastomer to heat the sheets and the interposed adhesive.

8. The method of forming a molded laminated structure from thin sheet material which includes the steps of placing a plurality of said sheets and one or more interposed layers of adhesive adjacent a contoured mold, mounting a relatively thick flat layer of electrically conducting elastomer upon a platen and positioning the elastomer in close proximity to the superposed sheets and on the opposite side thereof from said mold, passing an electric current through said elastomer to produce heat therein to heat the sheets and the interposed adhesive, applying pressure to the platen to force the latter and the elastomer toward the sheets and the mold, said elastomer being deformed by the pressure and flowing where necessary to mold the sheets to the contour of the mold, maintaining said heat and pressure until the sheets have become bonded together, and thereafter removing the molded structure from the mold.

9. The method of forming a molded plywood structure which includes the steps of placing a plurality of wood veneer sheets in close proximity to the surface of a contoured mold, coating some of said wood veneer sheets with adhesive to provide a layer of adhesive between adjacent sheets, positioning a relatively thin layer of electrically conducting rubber between the mold and the wood veneer sheets, positioning a relatively thick layer of elastomer on the opposite side of said wood veneer sheets from the mold, applying electrical energy to the relatively thin layer of electrically conducting rubber to heat the wood veneer sheets and the interposed adhesive, applying pressure to the relatively thick layer of elastomer to force the latter toward the mold, said elastomer being deformed and flowing where necessary to mold the wood veneer sheets to the contour of the mold and to bond said sheets together.

10. The method of forming a laminated structure which includes the steps of assembling a plurality of sheets of relatively thin material in superposed relation, applying an adhesive between adjacent sheets, positioning a layer of electrically conducting elastomer adjacent the superposed sheets, positioning a relatively thick layer of non-conducting elastomer adjacent the layer of electrically conducting elastomer, applying electrical energy to the electrically conducting elastomer to produce heat in close proximity to the sheets, and applying pressure to the sheets through the relatively thick layer of non-conducting elastomer.

11. The method of molding a laminated structure which comprises placing an electrically conducting elastomer adjacent thereto, passing an electric current through said electrically conducting elastomer to produce heat, placing a thick elastomer in close proximity to said electrically conducting elastomer, and applying pressure to said structure through said thick elastomer.

12. The method of forming a molded plywood structure from sheets of relatively thin wood with a layer of adhesive between adjacent sheets, which comprises applying heat to said wood sheets and interposed adhesive by passing an electric current through an electrically conducting rubber element placed near the sheets, and applying pressure to the sheets through a relatively thick deformable rubber member placed in close proximity to said sheets.

13. The method of forming a molded plywood structure from sheets of relatively thin wood with a layer of adhesive between adjacent sheets, which comprises positioning an electrically conducting rubber element on one side of said sheets, positioning a non-conducting element on the other side of said sheets, passing an electric current through said electrically conducting element to produce heat in close proximity to the sheets, and applying pressure to the sheets through the non-conductive rubber element to mold the sheets together.

JOHN D. LINDSAY.

REFERENCES CITED

The following references are of record in the file of this patent:

UNITED STATES PATENTS

| Number | Name | Date |
|---|---|---|
| 1,260,002 | Lanhoffer | Mar. 19, 1918 |
| 2,276,004 | Vidal | Mar. 10, 1942 |
| 2,324,644 | Powell | July 20, 1943 |
| 2,406,843 | Luth et al. | Sept. 3, 1946 |